United States Patent [19]

Pethis

[11] 4,325,590
[45] Apr. 20, 1982

[54] SELF-CONTAINED PRE-LOADED ANTIFRICTION BEARING ASSEMBLY

[75] Inventor: James J. Pethis, Farmington, Conn.

[73] Assignee: Textron Inc., Providence, R.I.

[21] Appl. No.: 152,374

[22] Filed: May 22, 1980

[51] Int. Cl.³ .................. F16C 19/08; F16C 25/08; F16C 27/04
[52] U.S. Cl. .................. 308/184 R; 308/189 A; 308/DIG. 10
[58] Field of Search .......... 308/184 R, 189 R, 189 A, 308/193, 195, 197, DIG. 10

[56] References Cited

U.S. PATENT DOCUMENTS

| | | | |
|---|---|---|---|
| 1,881,750 | 10/1932 | Llewellyn | 308/189 A |
| 2,648,025 | 8/1953 | Agule | 308/197 |
| 3,639,019 | 2/1972 | Schaeffler | 308/193 |
| 4,204,594 | 5/1980 | Banno | 308/187.1 |

FOREIGN PATENT DOCUMENTS

| | | | |
|---|---|---|---|
| 170806 | 3/1960 | Sweden | 308/189 A |
| 1151122 | 3/1969 | U.S.S.R. | 308/189 A |

*Primary Examiner*—Richard R. Stearns
*Attorney, Agent, or Firm*—Hopgood, Calimafde, Kalil, Blaustein & Judlowe

[57] ABSTRACT

The invention contemplates a unitary pre-loaded angular-contact antifriction bearing assembly or cartridge having particular application to highspeed textile manufacturing use wherein the spindle shaft incorporates the spaced inner raceways of the respective antifriction-element complements of the preloaded bearing, the direction of angular-contact preload being such as to place the spindle shaft under tension, between the spaced inner raceways. The bearing assembly incorporates features which greatly simplify operations necessary to the assembly of its component parts, as well as a feature whereby inadvertent disassembly is prevented.

11 Claims, 4 Drawing Figures

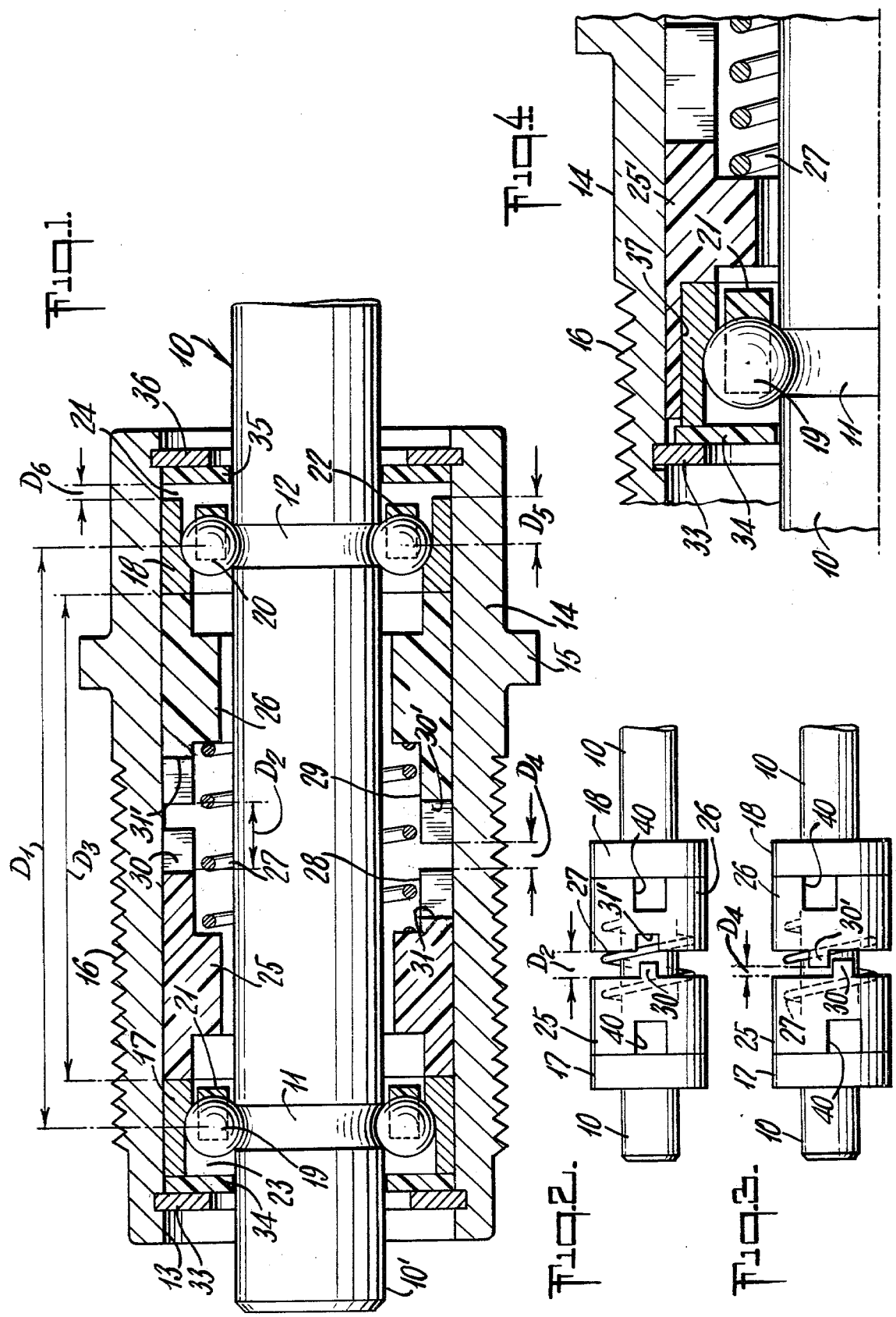

SELF-CONTAINED PRE-LOADED ANTIFRICTION BEARING ASSEMBLY

BACKGROUND OF THE INVENTION

The invention relates to a high-speed bearing assembly having particular application to the mounting of a textile spindle, wherein the inner raceways of two axially spaced antifriction bearings are circumferential groove formations on the spindle shaft itself.

In the past, belt-idler spindles and "friction-twister" spindles used in machines for the texturizing of synthetic-fiber filaments, as of nylon, rayon, polyester, etc. have been expected to run at speeds of 10,000 to 12,000 r.p.m., corresponding to a yarn speed of approximately 600 meters/minute, but recent competitive and other forces have dictated that yarn speed be doubled, meaning that spindles which had operated in the indicated range must now perform in the 20,000 to 25,000-r.p.m. range. The existing spindles have not been equal to the task and are the subject of frequent premature failure, thus necessitating shut-down for the awkward and uneconomic replacement procedure involved.

Typically, the spindle and bearing assembly which is subject to such failure comprises an elongate spindle shaft with two spaced raceways near one end. Outer race rings are assembled with a complement of balls at each of the inner raceways of the shaft, with a tubular spacer between outer rings to hold a fixed spacing of the resulting two ball bearings. The described components are assembled to the cylindrical bore of a mounting bushing, and ends of the bushing are inwardly deformed around axially outer limits of the thus-spaced outer rings, for permanent retention of the fixed spacing of the ball bearings. The outer contour of the mounting bushing is adapted for clamped mounting of the spindle and its bearing suspension on a mounting rail or the like of a textile machine.

It is my belief that failure of the indicated existing spindle-bearing assemblies at the indicated higher speeds is attributable to axial and/or radial looseness in one or both of the bearings. At high-speed rotation, each ball that is involved in such looseness seeks rotation about an axis of its own, and therefore pure-rolling contact of the ball with its raceways degrades, with accompanying skid-contact, meaning accelerated wear and tear. To replace a defective spindle-bearing assembly, the entire mounting bushing must be removed with the defective components which it contains.

BRIEF STATEMENT OF THE INVENTION

It is an object of the invention to provide an improved bearing assembly of the character indicated, and inherently capable of higher-speed operation, Another object is to provide such a bearing assembly which will automatically retain pure-rolling (i.e., nonskid) ball and raceway coaction, at speeds well in excess of the doubled-speed operation currently demanded.

It is also an object to meet the above objects with a bearing and spindle assembly which is effectively a cartridge that can be readily disassembled from the mounting bushing in which it is installed.

A further object is to meet the above objects with a construction of inherent simplicity to assemble and disassemble, as compared with prior constructions.

A still further object is to provide a feature of selectively locking against inadvertent disassembly of such a construction.

The invention achieves the foregoing and other objects and features in a unitary pre-loaded angular-contact bearing assembly wherein the direction of angular-contact preload is such as to place the spindle shaft under tension, between the spaced inner raceways. The preload force is provided by a single coiled spring which acts between (and therefore axially spreads) spacer collars into constant loading contact with the outer race rings through which the angular-contact action is developed.

DETAILED DESCRIPTION

The invention will be described in detail in connection with the accompanying drawings, in which:

FIG. 1 is a longitudinal sectional view of a spindle and bearing assembly of the invention, shown installed in a mounting bushing;

FIGS. 2 and 3 are like views in side elevation, showing spindle and bearing assembly of FIG. 1, for each of two different relations of parts; and FIG. 4 is a fragmentary longitudinal sectional view to show a second embodiment of the invention.

In FIG. 1, the invention is shown in application to an elongate spindle shaft 10 formed with two inner-raceway grooves 11-12, at axial spacing $D_1$ near one end of shaft 10. Shaft 10 and its antifriction-bearing suspension are a unit-handling assembly, removably retained in the cylindrical bore 13 of a mounting bushing 14. The outer contour of bushing 14 includes a flange 15 and threads 16 for mounting to a rail or other frame part of a textile machine, such as a filament-texturizing machine.

Each of the raceways 11-12 is the inner part of a pair of opposed angular-contact bearings, which also include outer race rings 17-18, and ball complements 19-20; and each complement of balls is held in preassembled correctly spaced array by a suitable retainer ring 21-22, as of injection-molded plastic. Each of the outer race rings 17-18 is of the typical angular-contact variety wherein the axially outer end is counterbored, as at 23, to the central plane of race-curvature centers, thus enabling outer-ring assembly to the associated ball complement 19. The bore 13 of the mounting bushing 14 is adapted to receive and locate the outer cylindrical surface of each of the outer rings 17-18. Two like spacer collars 25-26 also have outer cylindrical surfaces to fit the bore; each collar 25 (26) abuts its nearby outer ring 17 (18), and the ends of a coil spring 27 have preloaded compressional seating contact with locating counterbores 28-29 in the adjacent ends of collars 25-26. As best seen in FIGS. 2 and 3, the annular bodies of collars 25-26 are spaced by the relatively small distance $D_2$, thereby utilizing virtually all the span $D_3$ between outer rings 17-18 for bore (13) stabilized orientation of the collars and thus circumferentially uniform distribution of axial preloading forces to the respective outer race rings 17-18. The shaft 10 is placed under tension between raceways 11-12, and a secure and wide-based box-like stability results for retained central orientation of shaft 10 within the bearing assembly and its mounting bushing 14.

In accordance with a feature of the invention, the spacer collars incorporate corresponding dog and slot formations, 30-31 on collar 25, and 30'-31' on collar 26; the formations 30-31 may be at 180° angular offset in the inner end of collar 25, with formations 30'-31' at similar offset at the adjacent (inner) end of collar 26. When formations 30–31' and 31–30' are in angular register (FIG. 2), it is possible to compressionally displace collars 25–26 for full take-up of the spacing $D_2$, thereby reducing the outer-ring spacing $D_3$ by the amount $D_2$; on the other hand, when these formations are not in angular register (FIG. 3), it is possible to reduce the spacing between collars to the much lesser extent $D_4$. The distance $D_2$ preferably equals or exceeds the effective axial extent of the outer-ring counterbore 23 (24), i.e., distance $D_5$, and the distance $D_4$ is less than the distance $D_5$, for a purpose which will become clear.

In production of the unit-handling spindle and bearing assembly (10-17-18-19-20-25-26-27), the projecting small end 10' of shaft 10 is chucked on a vertical axis, i.e., with shaft 10 projecting vertically upward. A first ball complement 19, preassembled with its retainer ring 21 is slipped over the upper end of shaft 10 and manipulated to the point of ball (19) engagement in race groove 11. Outer ring 17 is then slipped over balls 19; and collar 25, spring 27, collar 26 and outer ring 18 applied in that order. Then, after manipulating formations 30–31' and 30'–31 into register (FIG. 2) ring 18 and collar 26 are displaced to collapse distance $D_2$, while a second ball complement 20 and its retainer 22 are slipped over the end of shaft 10 and into the then-exposed ball access to the second inner raceway groove 12, whereupon ring 18 is released for its spring-urged enveloping automatic assembly over balls 20. The assembly is now unit-handling and is made to lock-out the possibility of inadvertent disassembly, by rotating spacers 25–26 to a position of non-registration (FIG. 3). The described assembly is now a preloaded angular-contact bearing unit, with the shaft in tension, and ready for inventory or use.

To install the preloaded bearing unit in bushing 14, one end of bore 13 will have been effectively closed by a snap ring 33 seated in a local groove and retaining a shield disc 34, as of Teflon or other suitable material. The inserted bearing unit bottoms when outer ring 17 contacts the shield 34. At this point, a second shield 35 is applied and a small clearance $D_6$ exists to the groove which seats a second-retaining snap ring 36. This small clearance $D_6$ assures that bearings 19–20 will remain under angular-contact preload at all times, and independently of the instantaneous position that the bearing unit may assume with respect to bushing 14.

FIG. 4 shows a modified construction wherein all bearing-unit contact with the bore 13 of bushing 14 is via spacer collars such as collar 25'. The collar 25' is sufficiently more elongate than collar 25 (FIG. 1) to enable mounted reception of outer race ring 17' in an outer-end counterbore 37 of collar 25'. Similar construction will be understood to apply for the second collar 26' (not shown) but with end-counterbore reception and mounting of the other outer race ring 18.

The described preloaded bearing-unit or cartridge constructions will be seen to meet all stated objects. In a bushing (14) environment in which the invention is intended to supplant the existing unsatisfactory configuration, a 5/16-inch shaft 10 of 3.75-inch length, and supported via the described preloaded bearings 19–20 at effectively 1.20-inch central-plane spacing, the bearing assembly ran indefinitely, smoothly and cool at 40,000-r.p.m., well in excess of the currently doubled speed requirement.

While the invention has been described in detail for the preferred forms shown, it will be understood that modifications may be made without departing from the scope of the invention. For example, socket recesses 40 at diametrically opposed axially outward locations on spacer collars 25–26 provide operative access for fingers of a compression jig to hold the collapse of distance $D_2$ during an assembly or disassembly of the spindle-bearing cartridge unit.

What is claimed is:

1. In a textile or the like spindle assembly, a spindle shaft having a circumferential ball-raceway at each of two locations which are longitudinally spaced to an extent which substantially exceeds the shaft diameter, the ball retainers each having a complement of retained balls with the balls of one complement in one of said raceways and the balls of the other complement in the other of said raceways, an angular-contact outer race ring assembled to each complement of balls in the axial direction for loaded ball contact within the axial space between the planes of ball centers of the respective complements, an outer-ring spacer collar abutting each outer race ring in the space therebetween, adjacent axial ends of said spacer collars being in axial clearance with each other when said collars are abutted to their respective adjacent outer race rings and said adjacent axial ends each having spring-locating abutment means, and spring means in axially compressionally loaded relation to said outer race rings via the adjacent axial ends of said collars, the axially adjacent ends of said spacer collars being characterized by angularly spaced axially extending dog and dog-slot formations, there being at least one relative angular positioning relation of said collars wherein said formations register to permit axially compressed displacement of said collars toward each other to a first extent which exceeds their axially compressed displaceability when said formations are not in such registration, said first extent being at least substantially the axial extent to which the radial plane of the locus of centers of curvatures of the raceway of one of said outer race rings is offset from the axially outer end of said one outer race ring.

2. The spindle assembly of claim 1, in which the axially outer end of each spacer collar has a counterbore in which the adjacent outer race ring is seated.

3. The spindle assembly of claim 1, in which said spacer collars are injection-molded plastic components which are duplicates of each other.

4. As an article of manufacture, an elongate spindle-mounting bushing having external formations for mounting the same to a textile-machine mounting rail or the like, said bushing having a straight cylindrical bore, and a unitary spindle and pre-loaded bearing assembly of external cylindrical contour adapted for removable reception in the bushing bore; said bearing assembly comprising a spindle shaft of length exceeding that of said bushing and having near one end a circumferential ball-raceway at each of two locations which are longitudinally spaced to an extent less than the length of the bushing bore, an angular-contact outer race ring and an associated ball complement assembled to each of said spaced raceways in the axial direction for loaded ball contact within the axial space between the planes of ball centers of the respective complements, a pair of like spacer collars of outer diameter which is substantially the bushing-bore diameter interposed between and abutting said outer race rings, and spring means between said spacer collars and in axially compressionally loaded relation to said outer race rings via said spacer collars; said outer race rings fitting the bushing bore, and removable axial locating means coacting between spaced bushing-bore locations and the axially outer ends of the outer race rings of said assembly for axially retaining the inserted bearing assembly, the axially adjacent ends of said spacer collars being characterized by angularly spaced axially extending dog and dog-slot formations, there being at least one relative angular positioning relation of said collars wherein said formations register to permit axially compressed displacement of said collars toward each other to a first extent which exceeds their axially compressed displaceability when said formations are not in such registration, said first extent being at least substantially the axial extent to which the radial plane of the locus of centers of curvatures of the raceway of one of said outer race rings is offset from the axially outer end of said one outer race ring.

5. As an article of manufacture, an elongate spindle-mounting bushing having external formations for mounting the same to a textile-machine mounting rail or the like, said bushing having a straight cylindrical bore, and a unitary spindle and preloaded bearing assembly of external cylindrical contour adapted for removable reception in the bushing bore; said bearing assembly comprising a spindle shaft of length exceeding that of said bushing and having near one end a circumferential ball-raceway at each of two locations which are longitudinally spaced to an extent less than the length of the bushing bore, an angular-contact outer race ring and an associated ball complement assembled to each of said spaced raceways in the axial direction for loaded ball contact within the axial space between the planes of ball centers of the respective complements, a pair of like spacer collars of outer diameter which is substantially the bushing-bore diameter and having a counterbore at their respective axially outer ends with the adjacent outer race ring seated therein, said spacer collars having a spring-seating counterbore at their respective adjacent axially inner ends, and spring means seated in said adjacent-end counterbores and in axially compressionally loaded relation to said outer race rings via said spacer collars; said outer race rings fitting the bushing bore, and removable axial locating means coacting between spaced bushing-bore locations and the axially outer ends of the outer race rings of said assembly for axially retaining the inserted bearing assembly, the axially adjacent ends of said spacer collars being characterized by angularly spaced axially extending dog and dog-slot formations, there being at least one relative angular positioning relation of said collars wherein said formations register to permit axially compressed displacement of said collars toward each other to a first extent which exceeds their axially compressed displaceability when said formations are not in such registration, said first extent being at least substantially the axial extent to which the radial plane of the locus of centers of curvatures of the raceway of one of said outer race rings is offset from the axially outer end of said one outer race ring.

6. The article of claim 4 or claim 5, in which said axial locating means comprises at each of the spaced bushing-bore locations a snap-ring groove and associated snap ring.

7. The article of claim 4 or claim 5, in which an axial clearance exists between the bearing assembly and at least one of said axial-locating means.

8. The article of claim 4 or claim 5, in which a bearing shield is mounted to the bushing bore and is interposed between each axial-locating means and the adjacent outer bearing ring.

9. The article of claim 4 or claim 5, in which the axial span between outer ends of said outer race rings is at least twice the bore diameter of said mounting bushing.

10. In a textile or the like spindle assembly, a spindle shaft having a circumferential ball-raceway at each of two longitudinally spaced locations, two ball retainers each having a complement of retained balls with the balls of one complement in one of said raceways and the balls of the other complement in the other of said raceways, an angular-contact outer race ring assembled to each complement of balls in the axial direction for loaded ball contact within the axial space between the planes of ball centers of the respective complements, axially spaced adjacent means associated with adjacent axial ends of said outer race rings and characterized by angularly spaced axially extending dog and dog-slot formations, and spring means in axially compressionally loaded relation to said outer race rings via said axially spaced adjacent means, there being at least one relative angular positioning relation of said axially spaced adjacent means wherein said formations register to permit axially compressed displacement of said axially spaced adjacent means toward each other to a first extent which exceeds their axially compressed displaceability when said formations are not in such registration, said first extent being at least substantially the axial extent to which the radial plane of the locus of centers of curvatures of the raceway of one of said outer race rings is offset from the axially outer end of said one outer race ring.

11. As an article of manufacture, an elongate spindle-mounting bushing having external formations for mounting the same to a textile-machine mounting rail or the like, said bushing having a straight cylindrical bore, and a unitary spindle and pre-loaded bearing assembly of external cylindrical contour adapted for removable reception in the bushing bore; said bearing assembly comprising a spindle shaft of length exceeding that of said bushing and having near one end a circumferential ball-raceway at each of two locations which are longitudinally spaced to an extent less than the length of the bushing bore, an angular-contact outer race ring and an associated ball complement assembled to each of said spaced raceways in the axial direction for loaded ball contact within the axial space between the planes of ball centers of the respective complements, axially spaced adjacent means associated with adjacent axial ends of said outer rings and characterized by angularly spaced axially extending dog and dog-slot formations, and spring means in axially compressionally loaded relation to said outer race rings via said axially spaced adjacent means; said outer race rings fitting the bushing bore, and removable axial locating means coacting between spaced bushing-bore locations and the axially outer ends of the outer race rings of said assembly for axially retaining the inserted bearing assembly, there being at least one relative angular positioning relation of said axially spaced adjacent means wherein said formations register to permit axially compressed displacement of said axially spaced adjacent means toward each other to a first extent which exceeds their axially compressed displaceability when said formations are not in such registration, said first extent being at least substantially the axial extent to which the radial plane of the locus of centers of curvatures of the raceway of one of said outer race rings is offset from the axially outer end of said one outer race ring.

* * * * *